(12) United States Patent
Lim

(10) Patent No.: US 9,521,638 B2
(45) Date of Patent: Dec. 13, 2016

(54) TIME SYNCHRONIZING METHOD FOR AVB IN VEHICLE AND SYSTEM THEREOF

(71) Applicant: HYUNDAI MOBIS CO., LTD, Seoul (KR)

(72) Inventor: Bo Seob Lim, Yongin-si (KR)

(73) Assignee: HYUNDAI MOBIS CO., LTD, Seoul (KR)

( * ) Notice: Subject to any disclaimer, the term of this patent is extended or adjusted under 35 U.S.C. 154(b) by 118 days.

(21) Appl. No.: 14/697,912

(22) Filed: Apr. 28, 2015

(65) Prior Publication Data

US 2016/0142993 A1    May 19, 2016

(30) Foreign Application Priority Data

Nov. 13, 2014    (KR) .................. 10-2014-0158149

(51) Int. Cl.
*H04W 56/00*    (2009.01)
*H04B 1/3822*    (2015.01)

(52) U.S. Cl.
CPC ........ *H04W 56/0015* (2013.01); *H04B 1/3822* (2013.01)

(58) Field of Classification Search
None
See application file for complete search history.

(56) References Cited

U.S. PATENT DOCUMENTS

| 2012/0254851 A1* | 10/2012 | Diab | H04L 41/12 717/171 |
| 2013/0003757 A1* | 1/2013 | Boatright | H04J 3/0697 370/474 |
| 2015/0200974 A1* | 7/2015 | Pearce | H04L 43/08 709/203 |

FOREIGN PATENT DOCUMENTS

KR    10-2011-0040561 A    4/2011

* cited by examiner

*Primary Examiner* — Steven H Nguyen
(74) *Attorney, Agent, or Firm* — Knobbe Martens Olson & Bear LLP

(57) ABSTRACT

Disclosed are a time synchronizing method under a vehicle AVB environment and a system using the same. An AVN, which communicates with at least one device which is provided in a vehicle and performs a predetermined operation under an Ethernet AVB environment, synchronizes the at least one device by receiving a RTC time information message in the form of a RTC protocol packet which applies an IP protocol. Therefore, various services which synchronize a plurality of devices in the vehicle are provided, to improve convenience of a driver.

19 Claims, 8 Drawing Sheets

TIME SYNCHRONIZING METHOD FOR AVB IN VEHICLE AND SYSTEM THEREOF

CROSS-REFERENCE TO RELATED APPLICATIONS

This application claims priority to and the benefit of Korean Patent Application No. 10-2014-0158149 filed in the Korean Intellectual Property Office on Nov. 13, 2014, the entire contents of which are incorporated herein by reference.

TECHNICAL FIELD

The present disclosure relates to a time synchronizing method and a system using the same and more particularly, to a time synchronizing method for AVB in a vehicle and a system using the same.

BACKGROUND ART

Recently, due to development of a network and information communication equipment and spread of high quality multimedia contents, demands for a network based multimedia transmission system are being increased. Therefore, an audio video bridging (hereinafter, abbreviated as AVB) technology which transmits high quality audio and video data through an Ethernet network in real time is standardized as IEEE 802.1.

The AVB technology is a technology which connects high quality audio and video equipment to a network and transmits AV data through precise time synchronization in real time. According to the AVB technology, a plurality of analog cables of video and audio equipment is substituted by one Ethernet cable and data for controlling and managing each device is simultaneously transmitted so that high quality AV data is transmitted in real time and each device is controlled and managed at the same time. At an early stage of development of the technology, audio over Ethernet (AoE) which is specified for audio transmission is mainly developed by a specialized network and audio company, but products to which AVB is applied are being developed since 2011 when the AVB standardization has been completed.

Korean Unexamined Patent Application Publication No. 2011-0040561 discloses a technology which transmits data using an AVB technology in a vehicle AVN system.

SUMMARY

One aspect of the present invention provides a method for synchronizing time between devices under an AVB environment in a vehicle.

Another aspect of the present invention provides a time synchronizing system under an AVB environment of a vehicle using the method.

The embodiment of the present invention provides a time synchronizing method of a time synchronizing system including at least one device which is provided in a vehicle and performs a predetermined operation and an AVN which communicates with the at least one device under an Ethernet AVB environment, the method including: transmitting, by the at least one device, a RTC time information message to the AVN; mapping, by the AVN, RTC information of the AVN to device RTC time information included in the RTC time information message when the RTC time information message is received from the at least one device to store the mapped information; determining, by the AVN, whether N RTC time information messages are continuously received from each of the at least one device; and registering, by the AVN, the device as a device to interwork with the AVN when the N RTC time information messages are continuously received and setting a synchronous time using a time difference between the device RTC time information and the AVN RTC time information which are mapped with each other.

The setting of a synchronous time may include enumerating the device RTC time information and the AVN RTC time information in the time order to generate a RTC time array and an AVN time array; comparing the RTC time array with the AVN time array to generate N time differences; and calculating an average of N time differences to obtain the synchronous time.

The AVN may set the N as different values for each of the at least one device.

The method may further include, after the setting of a synchronous time, correcting the synchronous time with the at least one device when change of a predetermined period or status change of the at least one device to which the synchronous time is set occurs.

The correcting of the synchronous time may include: determining, by the AVN, whether the RTC time information message for at least one registered device is applied at the predetermined period; mapping the device RTC time information of the RTC time information message with the AVN RTC time information to store the mapped information when the RTC time information message is applied at the predetermined period; and recalculating and storing the synchronous time using a time difference between the device RTC time information and the AVN RTC time information which are stored.

The correcting of the synchronous time may include: determining whether a predetermined status change determining reference number or more of RTC time information messages are continuously received when the RTC time information message is not applied at the period; recalculating and storing the synchronous time using the time difference between the device RTC time information and the AVN RTC time information which are previously stored when the predetermined status change determining reference number or more of RTC time information messages are continuously received; and performing a predetermined device status changing job when the predetermined status change determining reference number or more of RTC time information messages are not continuously applied.

The performing of the device status changing job may include driving, by the AVN, a predetermined device status changing process to stop the interworking with the at least one device; and deleting, by the AVN, the device RTC time information, the AVN RTC time information, and the synchronous time which are previously stored.

Another embodiment of the present invention provides a time synchronizing system under a vehicle AVB environment, the system including at least one device which is provided in a vehicle, includes a RTC, generates a RTC time information message, and performs a predetermined operation; and an AVN which is provided in the vehicle, maps the RTC information of the AVN to device RTC time information included in the RTC time information message when the RTC time information message is received from the at least one device under an Ethernet AVB environment and stores the mapped information, registers a corresponding device when it is determined that N stored RTC Time information messages are continuously received, and sets a synchronous time using a time difference between the device RTC time information and the AVN RTC time information which are mapped with each other.

According to a time synchronizing method under an AVB environment of a vehicle of an embodiment of the present invention and a system using the same, at least one device in which RTC is set is individually synchronized by an AVN so that various services which synchronize a plurality of devices in a vehicle are provided, thereby improving convenience of a driver. Further, since AVN performs the synchronization using a message using an IP protocol, an amount of packets for synchronization is reduced so that a network traffic may be reduced. Further, even when the packet is not received or not processed, the AVN may update time information of the devices so that service shutdown in the vehicle may be minimized.

DETAILED DESCRIPTION OF EMBODIMENTS

Figure 1:
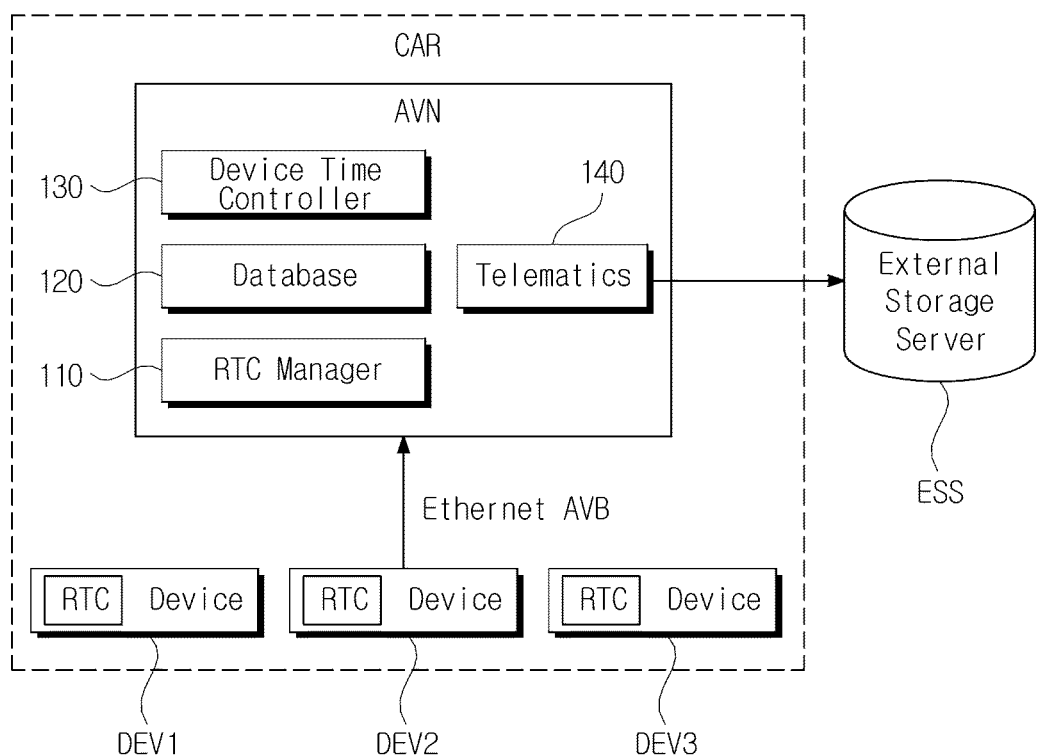
FIG. 1 illustrates a time synchronizing system under a vehicle AVB environment according to an embodiment of the present invention.

In order to sufficiently understand features and configurations of the present invention, the operational advantages of the present invention, and the objectives achieved by the embodiments of the present invention, the accompanying drawings illustrating embodiments of the present invention and the contents described therein need to be referred to.

Hereinafter, embodiments of the present invention will be described in detail with reference to the accompanying drawings. However, the present invention can be realized in various different forms, and is not limited to the embodiments described herein. In order to clearly describe embodiments of the present invention, a part which may obscure embodiments of the present invention may be omitted and like reference numerals denote like components.

In the specification, unless explicitly described to the contrary, the word "comprise" and variations such as "comprises" or "comprising", will be understood to imply the inclusion of stated elements but not the exclusion of any other elements. In addition, the terms "unit", "-er", "-or", "module", and "block" described in the specification mean units for processing at least one function and operation and can be implemented by hardware components or software components and combinations thereof.

Since a LAN, specifically, Ethernet which is a representative technology uses a frame based packet switching technology, it is hard to efficiently assure a transmission quality. Thus, according to the AVB, Ethernet bridge of the related art which performs packet switching is used to synchronize clocks of bridges within a predetermined geographical range to enable synchronous traffic transmission. When the clocks of the bridges are synchronized, a predetermined size of Ethernet frame is transmitted between bridges with a regular time interval at a desired time. Further, when such an operation appropriately expands, a bridge mesh may be used as an infra which stably transmits the synchronous traffics.

The Ethernet AVB (hereinafter, simply referred to as E-AVB) performs time synchronization between devices using gPTP (timing and synchronization for time-sensitive applications) defined in IEEE 802.1AS. However, when the E-AVB technology using gPTP is applied to a vehicle, network situations of various devices in the vehicle are different from a network situation of a device which is used at home or office, so that it is difficult to perform synchronization. This is because gPTP is a protocol which synchronizes times of individual devices to a master grand (master) device and thus when time synchronization with the master device is not completed, an E-AVB service cannot be provided.

In the E-AVB, an AVB transport protocol (hereinafter, abbreviated as "AVBTP") is used to perform multimedia transmission and devices which transmit multimedia data need to include AVBTP stack in order to use the AVBTP. However, the vehicle includes various devices in addition to a device which supports the E-AVB, but these devices do not include the AVBTP stack in many cases. Therefore, it is difficult to implement an E-AVB technology in a vehicle at a current situation. In other words, gPTP cannot be utilized. Further, it is difficult to add the AVBTP stack to the existing TCP/IP stack of small-size devices (for example, various sensors, a microphone, or an ECU) due to hardware restrictions. Therefore, until now, the E-AVB technology has not been applied to the vehicle.

From a viewpoint of a current vehicle development trend to add various user-oriented functions, desynchronization between devices in the vehicle under an AVB environment may cause inconsistency of an image and a sound of the multimedia data and significantly lower the convenience of the user. Further, it becomes a restriction of providing a service which interlinks various devices in the vehicle. However, a technology of synchronizing the devices under the AVB environment is not disclosed in the related art.

FIG. 1 illustrates a time synchronizing system in a vehicle AVB environment according to an embodiment of the present invention.

Referring to FIG. 1, a time synchronizing system according to an embodiment of the present invention includes at least one device DEV1 to DEV3, an AVN (audio, video, and navigation), and an external storage server (ESS). The AVN and the at least one device DEV1 to DEV3 are provided in the vehicle and the external storage server (ESS) is separately provided at the outside of the vehicle.

In the embodiment of the present invention, the AVN of the vehicle receives time information from the at least one device DEV1 to DEV3 and performs synchronization between the at least one device DEV1 to DEV3 using the received time information so that the AVN of the vehicle interworks with the at least one device DEV1 to DEV3 to perform various operations.

The at least one device DEV1 to DEV3 means a device which is provided in the vehicle to perform a predetermined operation and performs one way or two way data communication with the AVN. Further, the at least one device DEV1 to DEV3 includes a real time clock (RTC) to individually measure the time. Here, the RTC may be implemented such that the each device DEV1 to DEV3 includes a dedicated chip for RTC or a circuit.

Further, the at least one device DEV1 to DEV3 including the RTC transmits a RTC time information message to the AVN in the form of a RTC protocol packet which applies an IP protocol under a vehicle Ethernet AVB (hereinafter, simply referred to as an E-AVB) environment. In order to be registered to the AVN, the at least one device DEV1 to DEV3 continuously transmits N (here, N is an integer which is equal to or larger than 2) RTC time information messages. The RTC protocol packet will be described in detail below.

When the at least one device DEV1 to DEV3 individually operates, there is no need to transmit the RTC time information message to the AVN. However, in the embodiment of the present invention, since it is assumed that the at least one device DEV1 to DEV3 interworks with the AVN and other devices, the RTC time information message is transmitted to the AVN in order to perform the synchronization. As described above, when all of at least one device DEV1 to DEV3 and the AVN can use the NTP, the devices are individually synchronized with the NTP to be operated so that there is no need to separately perform synchronization. However, the at least one device DEV1 to DEV3 which is provided in the vehicle cannot use the NTP in most cases. Further, when a device which cannot use the NTP, the AVN, and other devices need to interwork with each other, the synchronization between devices needs to be necessarily performed.

The AVN is a device which interworks with the at least one device DEV1 to DEV3 in a vehicle to provide various services for a user and in the embodiment of the present invention, operates as a control unit which synchronizes at least one device DEV1 to DEV3.

The AVN includes a RTC manager 110, a database 120, a device time controller 130, and telematics 140.

The RTC manager 110 receives and analyzes a RTC time information message which is applied in the form of a RTC protocol packet which is applied from the at least one device DEV1 to DEV3 and stores device RTC time information in the database 120. When the RTC time information message is received, the RTC manager 110 obtains AVN RTC time information which is RTC time information of the AVN at a time when the RTC time information message is received and transmits the obtained AVN RTC time information and the device RTC time information to the database 120.

The database 120 maps the RTC time information which is applied from the RTC manager 110 with the AVN RTC time information corresponding to the RTC time information and stores the mapped information.

The device time controller 130 compares the device RTC time information on each device DEV1 to DEV3 stored in the database 120 with the AVN RTC time information and obtains a time difference between the device RTC time information and the AVN RTC time information to be stored as a synchronous time in the database and synchronizes at least one device DEV1 to DEV3 with the AVN using the stored synchronous time.

In this case, the device time controller 130 determines whether N RTC time information stored in the database 120 is continuously received, registers each device using a device identifier included in the continuously applied N RTC time information messages, and compares the stored device RTC time information with the mapped AVN RTC time information to synchronize the devices DEV1 to DEV3 with the AVN. The device time controller 130 determines whether the N RTC time information messages are continuously received in order to check a stability of interworking devices and a network status and obtain a precise RTC time of the devices DEV1 to DEV3. That is, the device time controller 130 calculates an average of time differences between N RTC time information and the AVN RTC time information and stores the average in the database 120.

Figure 2:
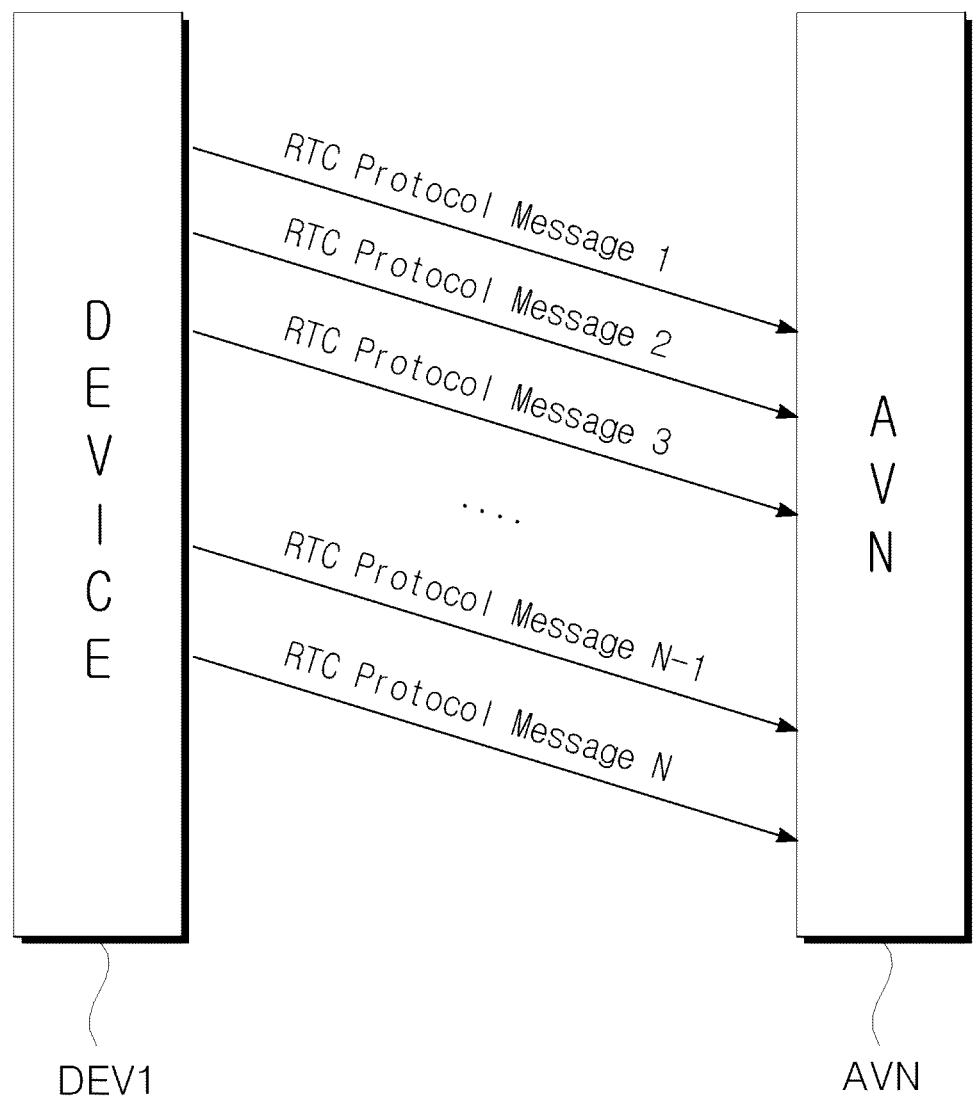
FIG. 2 illustrates a process of transmitting a RTC time information message to an AVN by a device in a time synchronizing system according to an embodiment of the present invention.

FIG. 2 illustrates a process of transmitting a RTC time information message to an AVN by a device in the time synchronizing system according to an embodiment of the present invention.

As illustrated in FIG. 2, when at least one device DEV1 to DEV3 transmits the RTC time information message to the AVN, transfer delay may occur in accordance with a network status. The transfer delay may occur in various modes in accordance with a network situation between the devices DEV1 to DEV3 and the AVN so that the RTC time information message may be transmitted from each of the devices to the AVN with different delay times. Even though it is illustrated in FIG. 2 that the transfer delay time of a plurality of RTC time information messages which is transmitted from one device to the AVN is the same, the transfer delay time between one device and the AVN may vary in accordance with the circumference situation.

Accordingly, when the AVN synchronizes the RTC time based on the RTC time information message which is transmitted one time, there may be strong possibility of error and it is difficult to determine whether the status of the network is stable. Therefore, according to the embodiment, as illustrated in FIG. 2, at least one device DEV1 to DEV3 continuously transmits the N RTC time information messages to the AVN, thereby increasing precision of a synchronizing job of the AVN.

Here, N which is the number of RTC time information messages transmitted from the at least one device DEV1 to DEV3 to the AVN may be set to be the same in all devices or may be set to be different from each other in all devices. For example, the device DEV1 is set to continuously transmit 10 RTC time information messages to the AVN and the device DEV2 is set to continuously transmit 12 RTC time information messages to the AVN. Under a particular situation such as a vehicle, since difference of status of the devices DEV1 to DEV3 and the network situations is significant, it is efficient to adjust the number N of RTC time information messages which are continuously transmitted from the device to the AVN while considering the difference. Therefore, when the number N of RTC time information messages which are transmitted from the devices DEV1 to DEV3 is set to be different, the device time controller 130 may determine whether the number N of RTC time information messages which are transmitted by the devices is stored in advance and the RTC time information messages are received as many as the set number.

The device time controller 130 obtains a synchronous time of the devices DEV1 to DEV3 again in accordance with a predetermined period even after registering and synchronizing the at least one device DEV1 to DEV3 and updates the synchronous time stored in the database 120. Further, even though the status of each of the registered devices DEV1 to DEV3 is changed, the device time controller 130 obtains the synchronous time again to update the synchronous time stored in the database 120. Further, when a status of each of the devices DEV1 to DEV3 is changed or it is determined that a capacity of the RTC time information corresponding to each of the devices DEV1 to DEV3 is equal to or larger than a predetermined reference storage capacity, the device time controller 130 controls the telematics 140 to back-up the RTC time information stored in the database 120 in the external storage server (ESS).

The telematics 140 performs communication with the external storage server (ESS) in accordance with the control of the device time controller 130 to transmit the RTC time information stored in the database 120 to be stored in the external storage server (ESS). The AVN of the vehicle is generally implemented under an embedded environment, so that a storage capacity of the database 120 may be limited in many cases. Therefore, the capacity of the database may be insufficient to continuously store the RTC time information which is obtained for each of the at least one device DEV1 to DEV3. Therefore, in the AVN according to the embodiment of the present invention, the device time controller 130 controls the telematics 140 to transmit and back-up the RTC time information stored in the database 120 to the external storage server (ESS) and then delete the RTC time information from the database 120, so that an appropriate amount of information is maintained in the database 120.

However, in recent years, the storage capacity of the AVN internal database 120 is also increased so that the ESS may be omitted if necessary and the telematics 140 may be also omitted.

Figure 3:
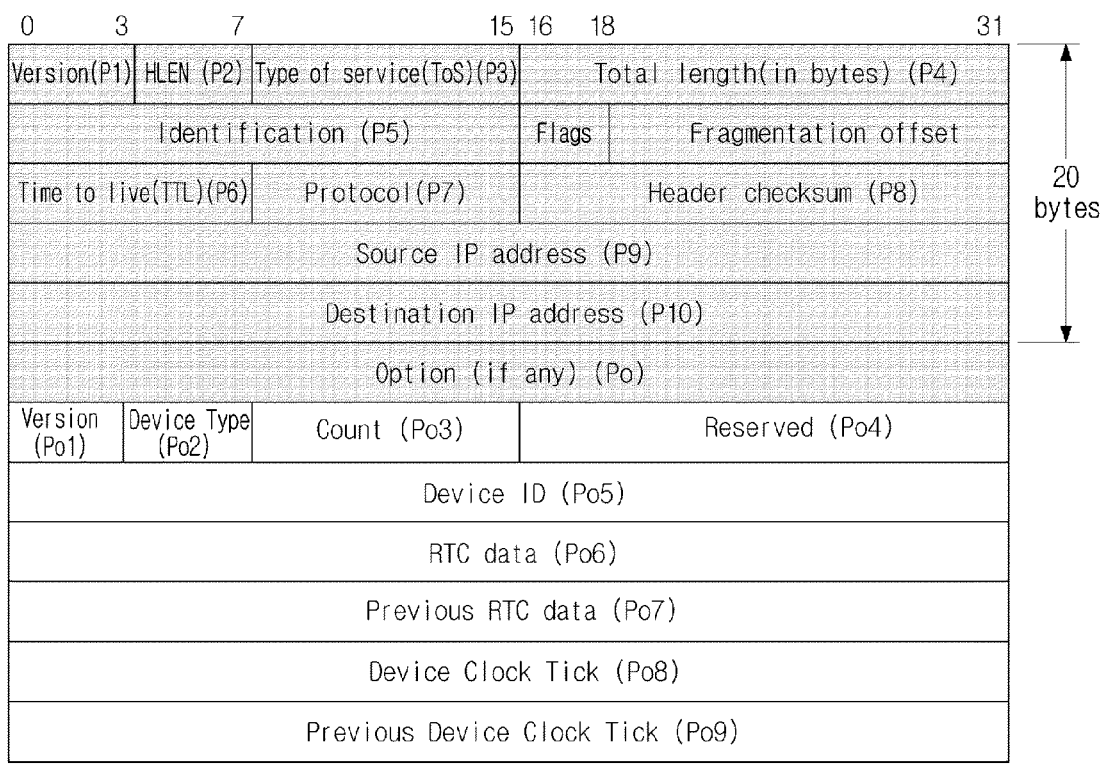
FIG. 3 illustrates a configuration of a RTC time information message according to an embodiment of the present invention.

FIG. 3 illustrates a configuration of a RTC time information message according to an embodiment of the present invention.

As described above, according to an embodiment of the present invention, the at least one device DEV1 to DEV3 transmits the RTC time information message to the AVN in the form of the RTC protocol packet which applies the IP protocol under the E-AVB environment. Since the E-AVB is also performed based on the Ethernet, the IP protocol is generally used and thus according to the embodiment of the present invention, the RTC time information message is configured by a RTC protocol packet which is newly suggested based on the IP protocol. When the RTC time information illustrated in FIG. 3 is analyzed, 20 bytes at the top utilize a packet configuration of a basic IP protocol as it is. The packet configuration of a basic IP protocol will be described. A version area P1 indicates a version of a protocol. HLEN P2 indicates header length and ToS P3 is a classifier for distinguishing a type of the service. Total length P4 is the entire packet (fragment) size including header and data. Identification P5 is an identification field and is primarily used for uniquely identifying the group of fragments of a single IP datagram. Flags P6 is used to control or identify fragments. Fragment Offset P7 indicates where in the datagram this fragment belongs. TTL P8 indicates the maximum time the datagram is allowed to remain in the internet system. Protocol P9 defines the protocol used in the data portion of the IP datagram. Header Checksum P10 is used for error-checking of the header. Source address P11 indicates the IP address of the sender of the packet and Destination address P12 indicates the IP address of the receiver of the packet.

Further, the RTC time information message which is configured by the RTC protocol packet of the embodiment of the present invention includes RTC time information and device information for RTC time synchronization in an option area of the existing IP protocol packet.

The configurations of the option area Po will be described. First, a version area Po1 indicates a version of a protocol. Device Type Po2 is a classifier for distinguishing a type of the device and Count Po3 indicates a number of times of transmitting a message. Reserved Po4 is a reserved field and Device ID Po5 indicates an identifier of each of the devices. RTC data Po6 indicates a device RTC time, Previous RTC data Po7 indicates a previous RTC time, Device Clock Tick Po8 and Previous Device Clock Tick Po9 indicate current and previous clock tick values of a device CPU, respectively. In the embodiment of the present invention, the device RTC time information indicates information including all RTC data Po6, Previous RTC data Po7, Device Clock Tick Po8, and Previous Device Clock Tick Po9.

Since there may be a deviation in a period of the time in the device RTC, the CPU clock tick value is included in the RTC time information message in order to correct the RTC time of the device by comparing the clock tick value of the device CPU with the CPU clock tick value.

Figure 4:
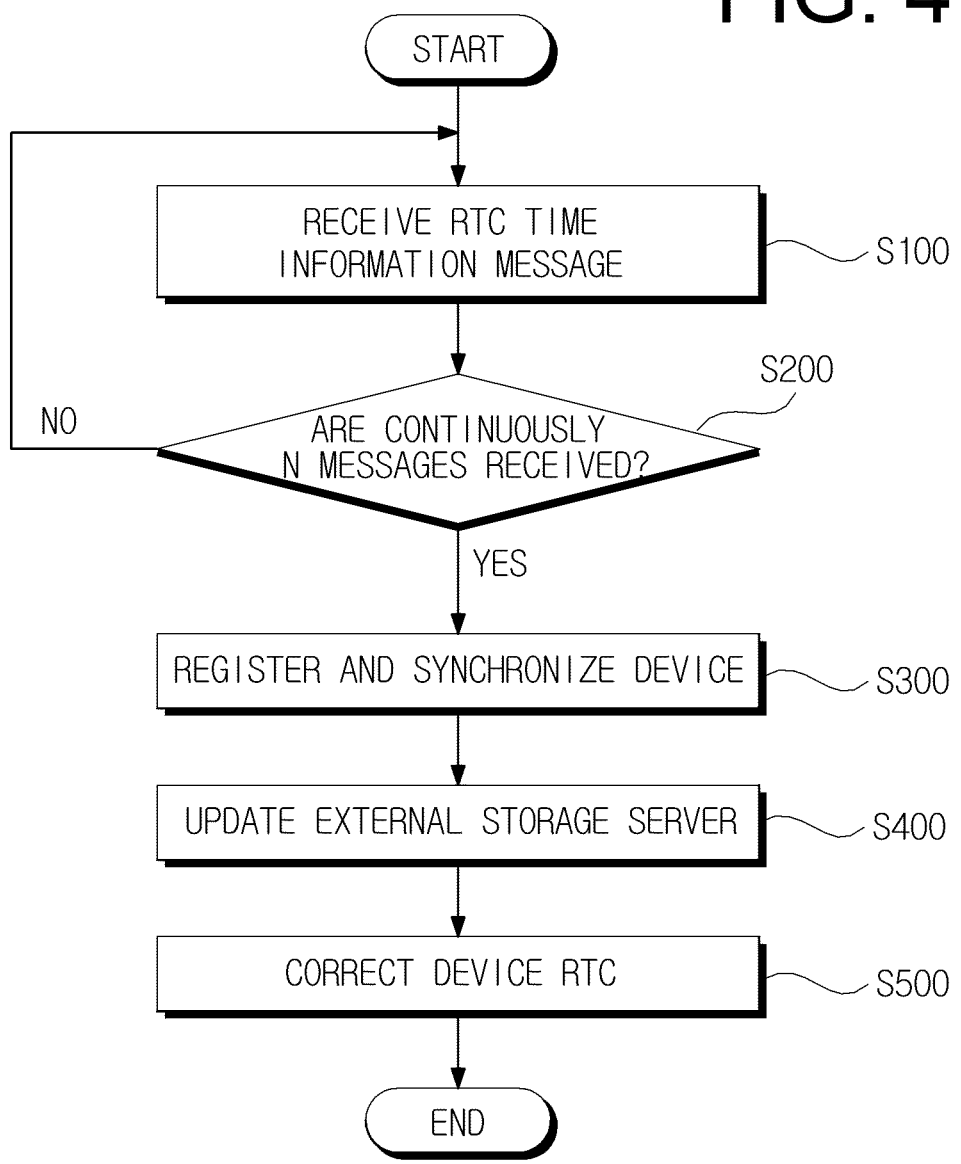
FIG. 4 illustrates a time synchronizing method in a vehicle AVB environment according to an embodiment of the present invention.

FIG. 4 illustrates a time synchronizing method in a vehicle AVB environment according to an embodiment of the present invention.

A time synchronizing method of FIG. 4 will be described with reference to FIGS. 2 to 4. First, an AVN receives a RTC Time information message which is applied in the form of a RTC protocol packet, transmitted from at least one device DEV1 to DEV3 in step S100. In this case, the AVN obtains AVN RTC time information at a time when the RTC time information message is received and maps and stores the device RTC time information with the AVN RTC time information in the database 120. The AVN determines whether applied N RTC time information messages are continuously received in step S200. When it is determined that N RTC time information messages are not continuously received, the AVN receives the RTC time information messages again in step S100.

In contrast, when it is determined that N RTC time information messages are continuously received, the device is registered using the Device Type and the Device ID included in the RTC time information message and time differences between the device RTC time information and the mapped AVN RTC time information are compared to perform synchronization in step S300.

When the device is registered and synchronized, the AVN transmits the information to the ESS through the telematics 140 to update the information which is stored in the ESS in step S400. Next, the AVN performs a predetermined operation together with the registered and synchronized device and corrects the device RTC in accordance with change of the predetermined period or status change of the device to maintain precision of the synchronization in step S500.

Figure 5:
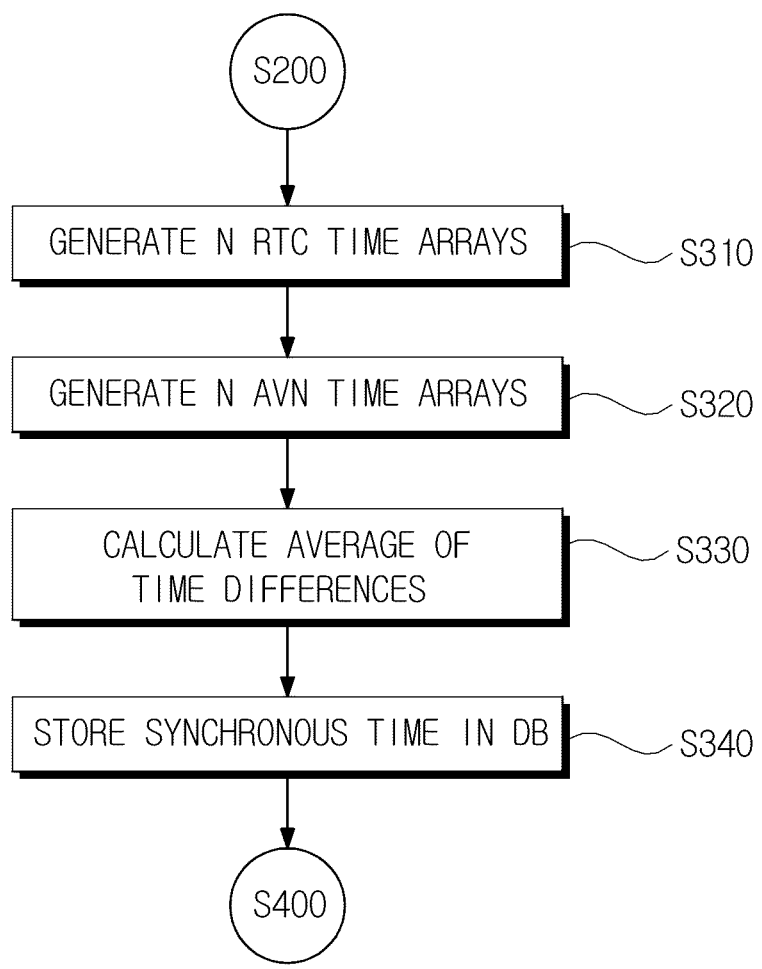
FIG. 5 is a view illustrating details of a device registering and synchronizing step of FIG. 4.

FIG. 5 is a view illustrating details of a device registering and synchronizing step of FIG. 4.

In the device registering and synchronizing step S300, the AVN receives the N device RTC time information stored in the database 120, and enumerates the information in the order of time to generate a RTC time array in step S310. The AVN receives N AVN RTC time information which is mapped to the device RTC time information and similarly enumerates the information in the order of time to generate an AVN time array in step S320.

The AVN compares the generated RTC time array with the AVN time array to calculate an average of time differences between the N device RTC time information and the AVN RTC time information, thereby obtaining a synchronous time in step S330. Here, the average is calculated because the transfer delay time may continuously vary depending on the circumference environment.

The AVN maps the synchronous time with the registered device to store the synchronous time in the database in step S340. That is, the AVN recognizes the time difference between the registered device and the AVN to perform the synchronization.

Figure 6:
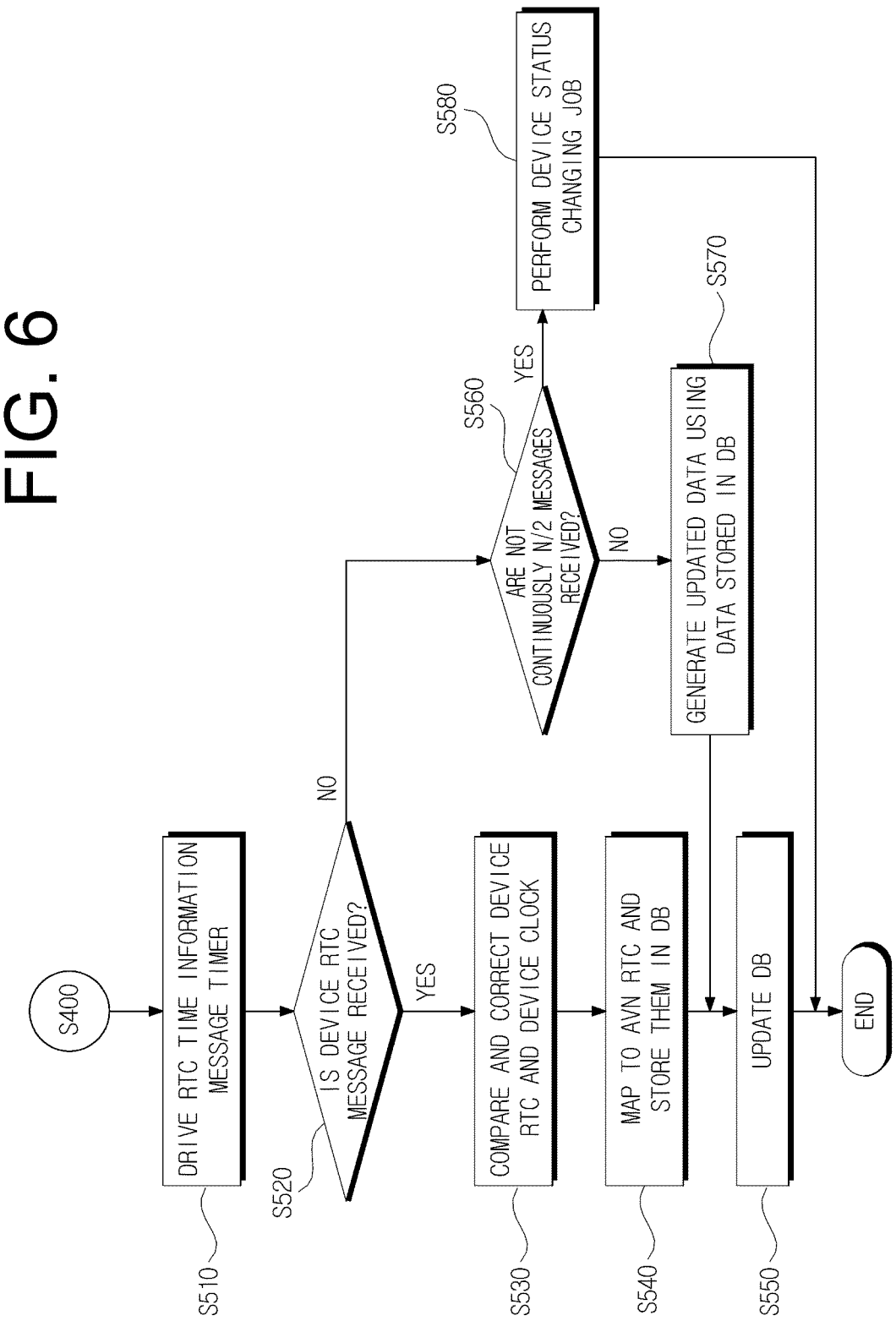
FIG. 6 is a view illustrating details of a device RTC correcting step of FIG. 4.

FIG. 6 is a view illustrating details of a device RTC correcting step of FIG. 4.

In the RTC correcting step S500, the device time controller 130 of the AVN drives a RTC time information message timer in step S510. The RTC time information message timer is provided in order to determine whether the RTC time information message is received at a predetermined period in the registered and synchronized device.

The device time controller 130 determines whether the RTC time information message is received from the device during a time set by the RTC time information message timer in step S520. When the RTC time information message is received, RTC data of the device RTC time information of the received RTC time information message is compared with the Clock Tick to correct the RTC data. This is because there may be a deviation in a time period of the RTC of the device. The corrected RTC data is mapped with the AVN RTC time information to be stored in the database 120 in step S540. Next, similarly to the device registering step, the synchronous time is recalculated using the device RTC time information and the AVN RTC time information and the calculated synchronous time is stored in the database 120 to update data which is stored in the database 120 in step S550.

In this case, the device time controller 130 checks a size of information for each device which is stored in the database 120 and when the size of the information is equal to or larger than a predetermined size, transmits the information stored in the database 120 to the ESS through the telematics 140 and deletes the information stored in the database 120.

In the meantime, when the RTC time information message is not received within a time set by the RTC time information message timer, the device time controller 130 determines whether N/2 messages are not continuously received in step S560. When it is determined that N/2 messages are continuously received, it may be determined that a temporary error occurs in the devices DEV1 to DEV3 or the network status. Therefore, the device time controller 130 recalculates the synchronous time using the data stored in the database and generates the calculated synchronous time as updated data in step S570. Further, the data stored in the database 120 is updated using the updated data in step S550.

In contrast, when N/2 messages are not continuously received, it is determined that the status of the devices DEV1 to DEV3 is changed or serious problem may occur in the network and a device status changing job is performed in step S580. Here, the device status change means changes of all status when the interworking job with the AVN cannot be performed.

In the above description, even though it is determined whether N/2 messages are continuously received in order to determine status change of the device or a failure of the network, the number of messages which are continuously received may be a reference number for determining whether the status is changed and may be set as other value.

Figure 7:
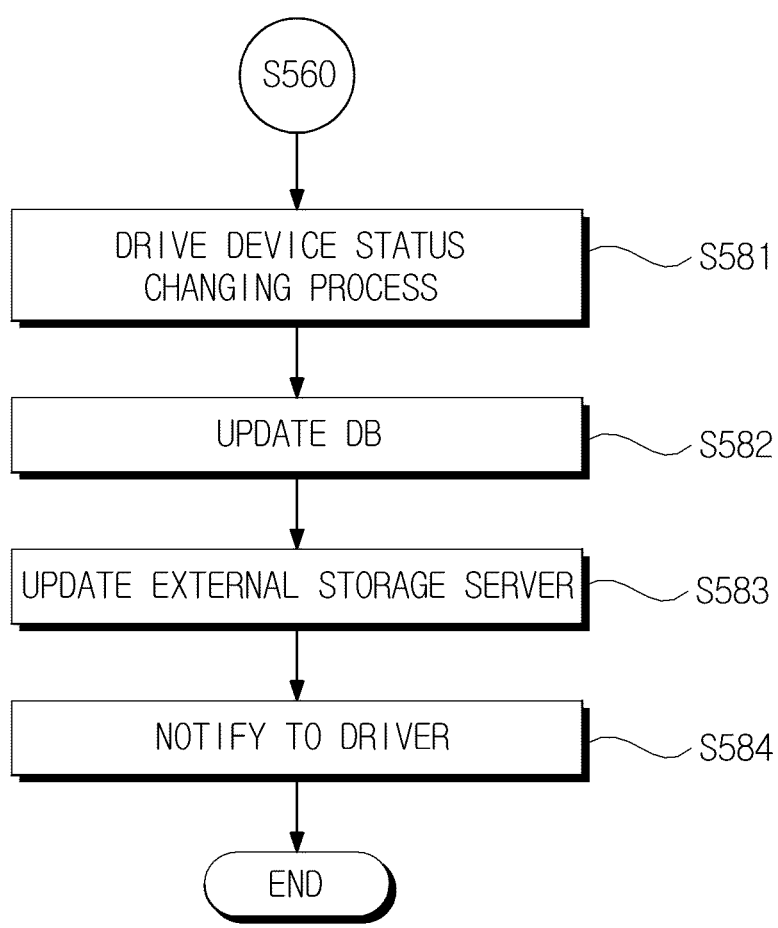
FIG. 7 is a view illustrating details of a device status changing job performing step of FIG. 6.

FIG. 7 is a view illustrating details of a device status changing job performing step of FIG. 6.

In the device status changing job S580, first, a device status changing process which is set in advance in the device time controller 130 is driven in step S581. The device status changing process may be implemented by a program in which a predetermined series of processing orders is designated in order to change the device status by the device time controller 130. When the device status changing process is driven, the device time controller 130 stops an operation which is performed by interworking with the device. Since the status of the devices DEV1 to DEV3 is changed, data stored in the database 120 corresponding to the device of which status is changed is deleted to update the database in step S582. Next, status change is notified to the ESS through the telematics 140 and the data of the ESS is also updated. Even though it is described above that stored data corresponding to the device is simply deleted, if necessary, only a part of data is deleted or the status change situation may be additionally stored in the database 120 or the ESS.

When the database 120 and the ESS are updated, the device time controller 130 notifies to the driver that the status of the device is changed, through a user interface provided in the AVN in step S584.

Figure 8:
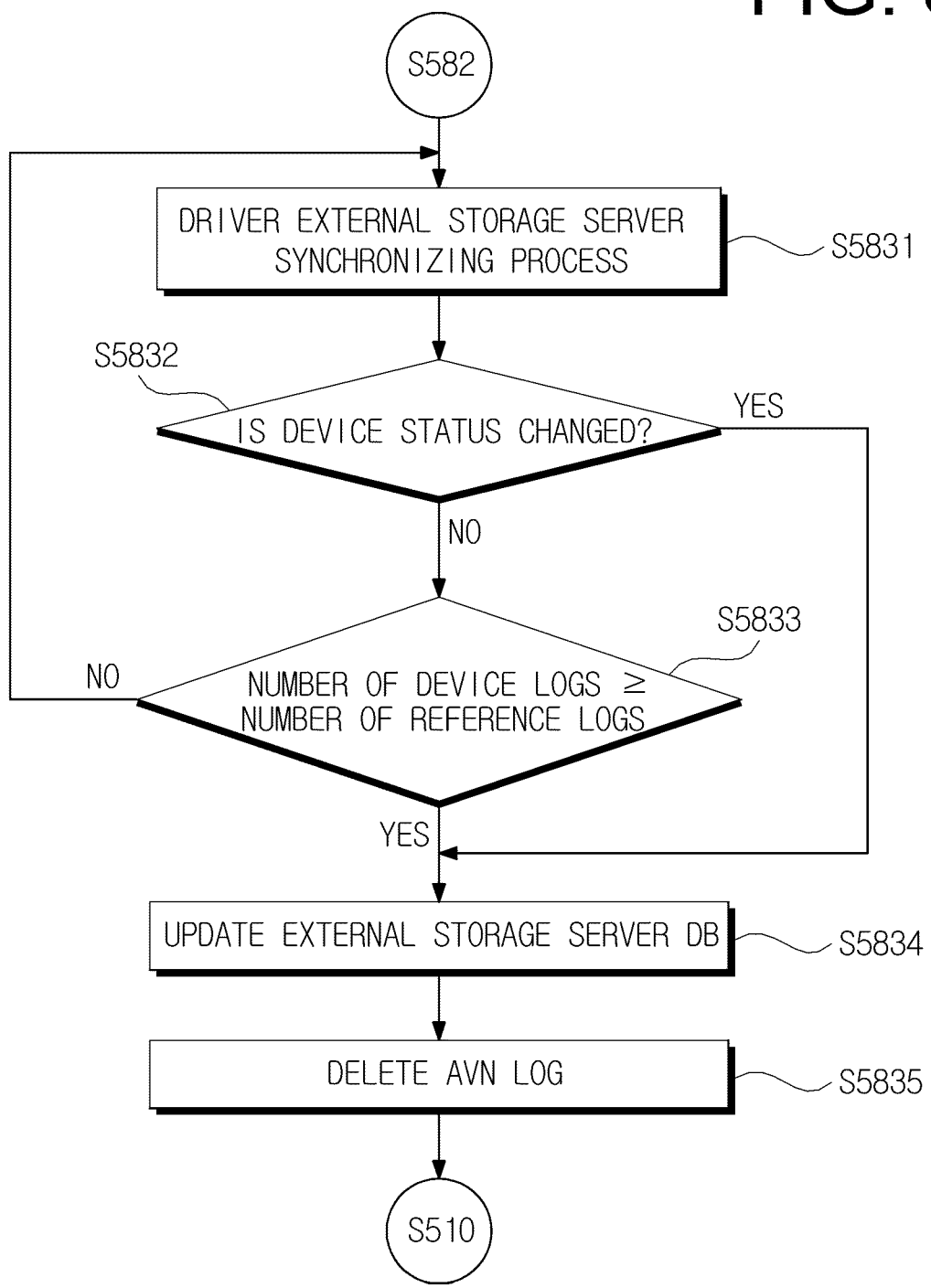
FIG. 8 is a view illustrating details of an external storage server updating step of FIG. 7.

FIG. 8 is a view illustrating details of an external storage server updating step of FIG. 7.

In the external storage server updating step S583, first, an external storage server synchronizing process which has been set in advance in the device time controller 130 is driven in step S5831. Similarly to the device status changing process, the external storage server synchronizing process may be implemented by a program in which a series of processing steps to update the external storage server ESS by the device time controller 130 is designated.

The device time controller 130 in which the external storage server synchronizing process is driven determines whether the status of the devices DEV1 to DEV3 is changed in step S5832. When it is determined that the status of the device is not changed, the device time controller 130 determines whether the number of device logs for each device stored in the database 120 is equal to or larger than a predetermined number of reference logs in step S5833. Here, the number of device logs means the number of RTC time information stored in the database 120.

When the number of device logs is equal to or larger than the predetermined number of reference logs, the device time controller 130 transmits the RTC time information stored in the database 120 to the ESS through the telematics 140 to update the external storage server. Next, the RTC time information which is stored in the database 120 of the AVN is deleted, so that the data in the database 120 does not exceed the predetermined storage capacity.

Even though, in FIG. 8, the external storage server updating step S583 is illustrated as a partial process of the device status changing job performing step S580, the external storage server updating step S583 may be similarly applied to the external storage server updating step S400 of FIG. 4 and may be included in the database updating step S550 of FIG. 6.

A method according to the embodiment of the present invention can be implemented as a computer-readable code in a computer-readable recording medium. The computer-readable recording medium includes all types of recording device in which data readable by a computer system is stored. Examples of the recording medium are ROM, RAM, CD-ROM, a magnetic tape, a floppy disk, an optical data storing device and also implemented as a carrier wave (for example, transmission through the Internet). The computer readable recording medium may be distributed in computer systems connected through a network and a computer readable code may be stored therein and executed in a distributed manner.

Embodiments of the present invention have been described, but the embodiments are only illustrative, and it would be appreciated by those skilled in the art that various modifications and equivalent embodiments may be made.

Accordingly, the actual scope of the present invention must be determined by the spirit of the appended claims.

What is claimed is:

1. A time synchronizing method under a vehicle Audio Video Bridging (AVB) environment of a time synchronizing system including at least one device which is provided in a vehicle and performs a predetermined operation and an Audio Video Navigation (AVN) which communicates with the at least one device under an Ethernet AVB environment, the method comprising: transmitting, by the at least one device, a Real Time Clock (RTC) time information message to the AVN; mapping, by the AVN, RTC information of the AVN to device RTC time information included in the RTC time information message when the RTC time information message is received from the at least one device to store the mapped information; determining, by the AVN, whether N RTC time information messages are continuously received from each of the at least one device; and registering, by the AVN, the device as a device to interwork with the AVN when the N RTC time information messages are continuously received and setting a synchronous time using a time difference between the device RTC time information and the AVN RTC time information which are mapped with each other.

2. The method of claim 1, wherein the setting of the synchronous time includes:
enumerating the device RTC time information and the AVN RTC time information in the time order to generate a RTC time array and an AVN time array;
comparing the RTC time array with the AVN time array to generate N time differences; and
calculating an average of N time differences to obtain the synchronous time.

3. The method of claim 1, wherein the AVN sets the N as different values for each of the at least one device.

4. The method of claim 1, further comprising:
after the setting of a synchronous time, correcting the synchronous time with the at least one device when change of a predetermined period or status change of the at least one device to which the synchronous time is set occurs.

5. The method of claim 4, wherein the correcting of the synchronous time includes:
determining, by the AVN, whether the RTC time information message for at least one registered device is applied at the predetermined period;
mapping the device RTC time information of the RTC time information message with the AVN RTC time information to store the mapped information when the RTC time information message is applied at the predetermined period; and
recalculating and storing the synchronous time using a time difference between the device RTC time information and the AVN RTC time information which are stored.

6. The method of claim 5, wherein the correcting of the synchronous time includes:
determining whether a predetermined status change determining reference number or more of RTC time information messages are continuously received when the RTC time information message is not applied at the period;
recalculating and storing the synchronous time using the time difference between the device RTC time information and the AVN RTC time information which are previously stored when the predetermined status change determining reference number or more of RTC time information messages are continuously received; and
performing a predetermined device status changing job when the predetermined status change determining reference number or more of RTC time information messages are not continuously applied.

7. The method of claim 6, wherein the performing of the device status changing job includes:
driving, by the AVN, a predetermined device status changing process to stop the interworking with the at least one device; and
deleting, by the AVN, the device RTC time information, the AVN RTC time information, and the synchronous time which are previously stored.

8. The method of claim 7, further comprising:
after the setting of the synchronous time, transmitting the device RTC time information, the AVN RTC time information, and the synchronous time to an external storage server which is provided at the outside of the vehicle to store them in the external storage server.

9. The method of claim 8, wherein the performing of the device status changing job further includes:
after the deleting of the synchronous time,
transmitting the status change information to the external storage server to delete the device RTC time information, the AVN RTC time information, and the synchronous time which are stored in the external storage server.

10. The method of claim 8, wherein the correcting of the synchronous time further includes:
after the recalculating and storing of the synchronous time,
determining whether the number of the device RTC time information for the at least one device, which is stored in the AVN is equal to or larger than a predetermined reference number;
transmitting the device RTC time information, the AVN RTC time information, and the synchronous time which are stored in the AVN to the external storage server and storing them in the external storage server, when the number of the device RTC time information is equal to or larger than the reference number; and
deleting the device RTC time information, the AVN RTC time information, and the synchronous time which are stored in the AVN.

11. The method of claim 1, wherein the RTC time information message is configured in the form of a RTC protocol packet including the number of times of transmitting a message, a device identifier, and a RTC time in an option area of an IP protocol packet.

12. The method of claim 11, wherein the RTC time information message further includes a previous RTC time, a CPU clock tick of the device, and a previous CPU clock tick of the device.

13. A time synchronizing system under a vehicle Audio Video Bridging (AVB) environment, the system comprising:
at least one device which is provided in a vehicle, includes a Real Time Clock (RTC), generates a RTC time information message, and performs a predetermined operation; and an Audio Video Navigation (AVN) which is provided in the vehicle, maps the RTC information of the AVN to device RTC time information included in the RTC time information message when the RTC time information message is received from the at least one device under an Ethernet AVB environment and stores the mapped information, registers a corresponding device when it is determined that N stored RTC Time information messages are continuously received, and sets a synchronous time using a time difference between the device RTC time information and the AVN RTC time information which are mapped with each other.

14. The system of claim 13, wherein the AVN includes:
- an RTC manager which receives and analyzes the RTC time information message to obtain the RTC time information and the AVN RTC time information;
- a database which stores the RTC time information, the AVN RTC time information, and the synchronous time; and
- a device time controller which calculates an average of time differences between the N RTC Time information and the N AVN RTC time information which are stored in the database to obtain the synchronous time and stores the obtained synchronous time in the database.

15. The system of claim 14, wherein the device time controller determines whether the RTC time information message is received from the at least one device at a predetermined period and when the RTC time information message is received, recalculates the synchronous time using the RTC time information of the received RTC time information message and the AVN RTC time information to store the synchronous time in the database.

16. The system of claim 15, wherein the device time controller determines whether a predetermined status change determining reference number or more of RTC time information messages are continuously received when the RTC time information message is not applied at the period and when the predetermined status change determining reference number or more of RTC time information messages are continuously received, recalculates and stores the synchronous time using a time difference between the device RTC time information and the AVN RTC time information which are previously stored.

17. The system of claim 16, wherein when the predetermined status change determining reference number or more of RTC time information messages are not continuously received, the device time controller drives a predetermined device status change process to stop interworking with the at least one device and deletes the device RTC time information, the AVN RTC time information, and the synchronous time which are stored in the database.

18. The system of claim 17, wherein the AVN further includes:
- telematics which communicates with an external storage server which is provided at the outside of the vehicle, and
- when the number of the RTC time information which is stored in the database is equal to or larger than a predetermined reference number or the device status change process is driven, the device time controller stores the device RTC time information, the AVN RTC time information, and the synchronous time in the external storage server, and then deletes the device RTC time information, the AVN RTC time information, and the synchronous time which are stored in the database.

19. The system of claim 13, wherein the RTC time information message is configured in the form of a RTC protocol packet including the number of times of transmitting a message, a device identifier, and a RTC time in an option area of an IP protocol packet.

* * * * *